United States Patent

Takahashi et al.

[15] 3,671,936
[45] June 20, 1972

[54] DISCONTINUITY PROCESSING APPARATUS FOR AUTOMATIC CURVE TRACING SYSTEM

[72] Inventors: Tadashi Takahashi; Masatoshi Miyazaki, both of Sendai; Yasuhiko Ogawa, Natori; Tadashi Sato; Kazuhiko Kakuta, both of Tokyo, all of Japan

[73] Assignee: Iwatsu Electric Company Ltd.

[22] Filed: May 28, 1970

[21] Appl. No.: 41,296

[30] Foreign Application Priority Data

May 31, 1969 Japan..................................44/42077

[52] U.S. Cl......................................340/146.3 AE, 250/202
[51] Int. Cl..............................................................G06k 9/16
[58] Field of Search....................250/202, 219 QA; 318/577; 340/146.3; 178/6.8

[56] References Cited

UNITED STATES PATENTS 3,245,036  4/1966  Gröttrup............................250/202 X
2,816,705  12/1957  Thrall et al. ............................250/202
3,429,989  2/1969  Stockdale..........................250/202 X
3,423,589  1/1969  Bardwell et al........................250/202
3,502,882  3/1970  Von Voros............................250/202

Primary Examiner—Maynard R. Wilbur
Assistant Examiner—Leo H. Boudreau
Attorney—Chittick, Pfund, Birch, Samuels & Gauthier

[57] ABSTRACT

In an automatic curve tracing system comprising a detector for performing a round scanning operation along the periphery of an area containing a curve to be traced to provide an information regarding the presence or absence and the position of the curve, means responsive to the information to move the detector in a predetermined direction and over a predetermined distance to trace the curve and means for repeating above described tracing operation, there is provided a discontinuity processing apparatus comprising means to broaden the scanning area of the detector, means to determine the number of informations generated by the detector when it performs the round scanning operation, means responsive to the number of informations corresponding to a discontinuity of the curve and means to broaden the scanning area of the detector when it reaches the discontinuity to judge the presence or absence of another curve to be traced.

2 Claims, 8 Drawing Figures

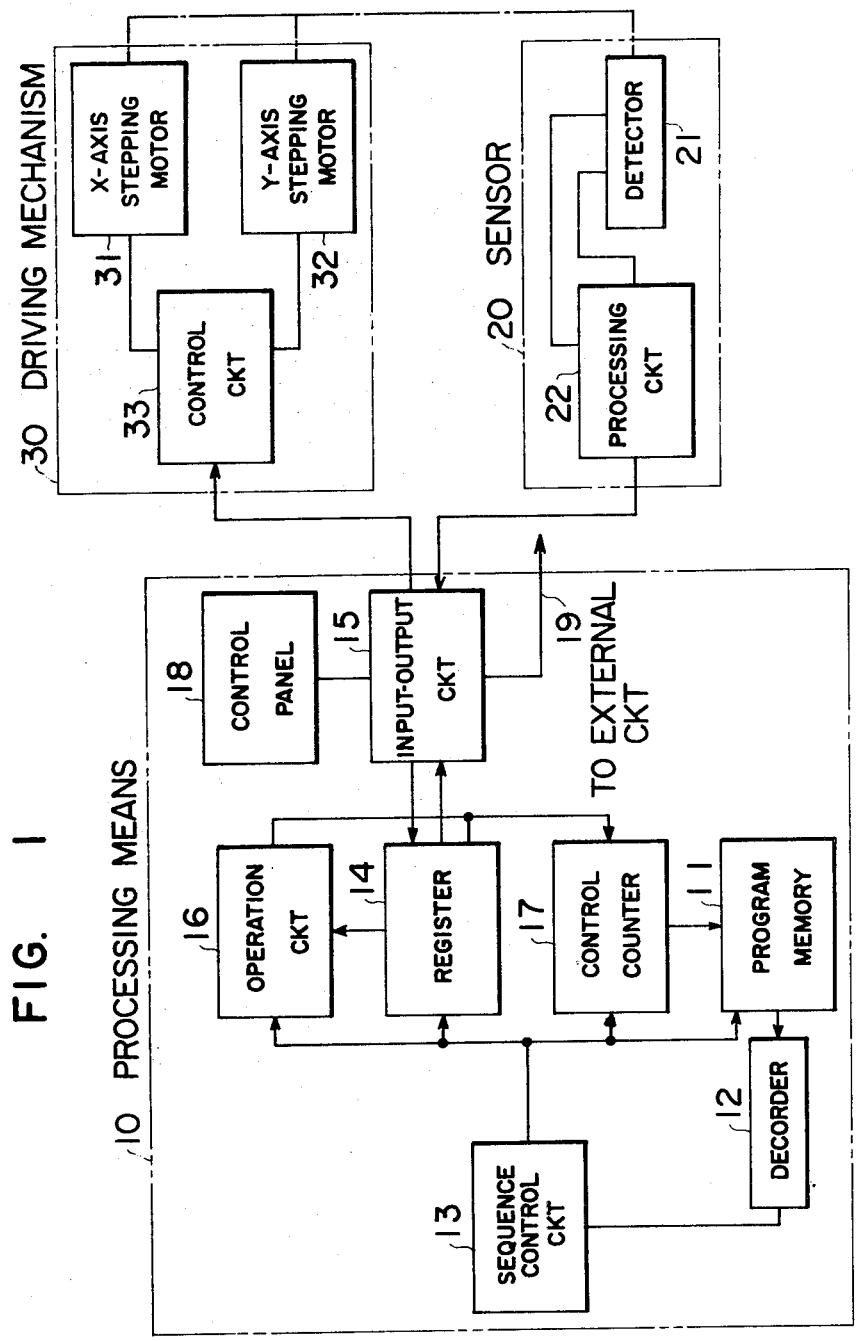
TADASHI TAKAHASHI
MASATOSHI MIYAZAKI
YASUHIKO OGAWA    INVENTORS
TADASHI SATO
KAZUHIKO KAKUTA
ATTORNEY

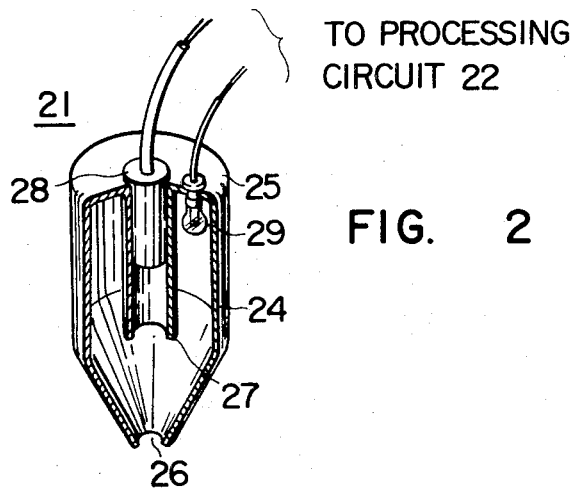
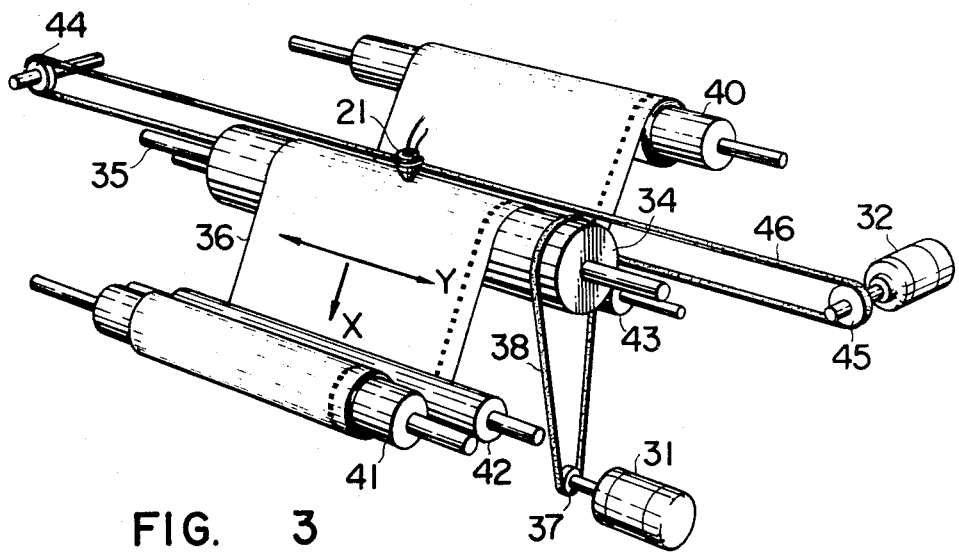

TADASHI TAKAHASHI
MASATOSHI MIYAZAKI
YASUHIKO OGAWA      INVENTORS
TADASHI SATO
KAZUHIKO KAKUTA

DISCONTINUITY PROCESSING APPARATUS FOR AUTOMATIC CURVE TRACING SYSTEM

CROSS REFERENCE TO RELATED APPLICATIONS

This application is related to applications filed of even date herewith, Ser. Nos: 41,297, 41,172, 41,291 and 41,471, all assigned to the assignee of the present invention.

BACKGROUND OF THE INVENTION

This invention relates to an automatic curve tracing apparatus and more particularly to an apparatus for descriminating a discontinuity in a curve or pattern to be traced.

In many fields of engineering it is desirable to automatically trace patterns in the form of various curves, segments and the like depicted on a sheet of drawing to convert them into electrical digital signals. Such requirements arise when various waveforms such as cardiograms, brain waves, earthquake waves and the like, for example, are to be automatically analyzed to identify their patterns. Further, when supplying various data curves to a standard electronic computer, at present such data curves are converted into technical terms with a great labor and time and the converted informations are then supplied to the input device of the computer. Although it is desirable that the curve to be traced is continuous, it often contains one or more discontinuities or unclear portions. Further, a curve is terminated at its ends. Accordingly it is necessary to provide an apparatus means to process such discontinuities.

SUMMARY OF THE INVENTION

Accordingly, it is an object of this invention to provide a novel apparatus for automatically tracing various curves depicted on the sheet of drawing and capable of processing discontinuities appearing during the tracing process.

Another object of this invention is to provide a novel tracing apparatus which scans only a limited area upon reaching a discontinuity whereby to eliminate useless processing.

Further object of this invention is to provide a novel curve tracing apparatus which continues its tracing operation even when a discontinuity exists in a curve being traced.

According to this invention there is provided an automatic curve tracing apparatus wherein successive spots of a drawing, that is small sections of a curve and surrounding areas are detected by a detector to determine whether there is a curve or not, and the results are converted into electric signals which are used to determine a direction in which the detector is to be directed or traced. The detector is moved relative to the drawing to perform a round scanning operation to obtain positional information regarding the presence or absence of the curve. As used herein the term "a round scanning" means a scan path around the periphery of a designated elemental area. These positional data are utilized to move the detector in a predetermined direction over a predetermined distance thus tracing the curve or pattern. Such a partial tracing operation is repeated along the length of the curve thus continuously tracing the same. According to this invention there are further provided means to enlarge the scanning area of the detector and means to determine the number of data corresponding to the presence or absence of the curve during a round scanning operation of the detector whereby when the detector reachs a discontinuity of the curve the scanning area of the detector is enlarged to search for the curve to be traced. This broadening of the scanned area makes easy judgment as to whether the curve is terminated at the discontinuity or continues further. Upon detection of the succeeding portion of the curve the detector is directed thereto. In this manner, it is possible to continuously trace a curve or pattern even when it contains one or more discontinuities.

According to another feature of this invention, upon detection of the curve to be traced the center of the round scanning operation of the detector is shifted so as to always contain the curve in the scanning area of the detector, and while the detector is being shifted its scanning area is gradually decreased to its original area and the tracing operation is continued in the direction of the curve. In this manner, it becomes possible to continuously trace at a high accuracy a curve containing a discontinuity.

According to further feature of this invention there is provided a memory which stores an information corresponding to the direction of the last tracing of the curve when a discontinuity is reached during the tracing process of the curve so as to gradually increase the scanning area of the detector. The scanning area of the detector is gradually increased in a direction in which the difference between the information is within predetermined limits until a further curve is detected.

Thus, the tracing operation is proceeded on the assumption that the curve being traced is included in a predetermined limited area so that it is possible to eliminate useless processing of the discontinuity.

BRIEF DESCRIPTION OF THE DRAWINGS

The invention can be more fully understood from the following detailed description taken in conjunction with the accompanying drawing in which:

FIG. 1 is a block diagram of one embodiment of an automatic pattern tracing system incorporated with a discontinuity processing apparatus constructed according to the principle of this invention;

FIG. 2 is a perspective view, partly in section, of a detector utilized in the system shown in FIG. 1;

FIG. 3 is a perspective view of the driving mechanism shown in FIG. 1 showing the relationship between a recording paper carrying a pattern, and a detector:

DESCRIPTION OF THE PREFERRED EMBODIMENT

Figure 4:
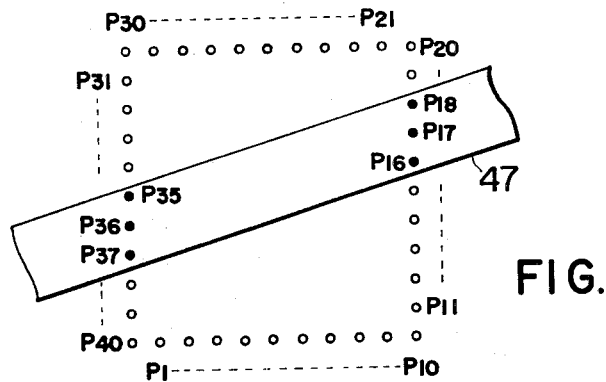
FIG. 4 is a diagram to explain the relationship between the round scanning operation of the detector, the detector output and the output from a processing circuit when a curve depicted on the recording paper is traced.

Referring now to FIG. 1 of the accompanying drawing, the entire system of this invention is shown as comprising a processing means 10, a sensor 20 and a driving mechanism 30, the sensor reading the positional information of a pattern to be traced and depicted on a sheet of drawing to send the information to the processing means. The processing means 10 suitably processes the information so as to operate the driving mechanism 30 in accordance with the resulting digital signal thus shifting sensor 20 a predetermined distance in a predetermined direction. Then the positional information of the pattern at the shifted position is again read by sensor 20. The above described cycle of operations is repeated to automatically trace the entire pattern. The digital signal produced at each time is sent to an electronic competer and the like, not shown.

The detail of each component part will now be described. The sensor 20 comprises a detector 21 to convert the concentration, that is the black and white tones of the pattern into electric signals and a processing circuit 22 to suitably process electrically the output from the detector 21. In this embodiment, the detector 21 comprises a photoelectric detector of the construction shown in FIG. 2. As shown in FIG. 2 the detector 21 comprises a cylindrical casing 24 of opaque material having a top closed end 25 and a frustoconical bottom portion having a bottom opening 26. Inside the casing 24 is formed a cylinder 27 concentrically with casing 24. One end of the cylinder 27 is secured to the upper end 25 of the casing 24 while the opposite end is terminated at a point slightly above the bottom opening 26. Within cylinder 27 is disposed a light receiving element or a photoelectric converting element 28 and a light source 29 is disposed in a space between cylinder 27 and casing 24. Accordingly, when sensor 20 is in its operating state, light is projected toward outside from source 29 through opening 26. The photoelectric converting element 28 operates to receive the light projected upon a point being scanned on the pattern and reflected therefrom and transforms it into an electric signal.

The processing circuit 22 operates to shape the waveform of the electric signal supplied from photoelectric converting element 28 to descriminate white and black to provide a binary output of "1" or "0", the former corresponding to white and the latter to black. These signals are continuously supplied to processing means 10 from sensor 20.

The driving mechanism 30 comprises two stepping motors 31 and 32 and a control circuit 33 to control stepping motors in responce to a signal supplied from processing means 10, the detail of the driving mechanism being shown in FIG. 3.

As shown in FIG. 3 the driving mechanism comprises a rotary drum 34 having a shaft 35 and a recording paper 36 described with a pattern to be traced by the detector 21 is passed about the periphery of rotary drum 34. The rotary drum 34 is driven by stepping motor 31 via a belt 38 to drive the recording paper 36 in a direction indicated by a arrow (X axis). The recording paper 36 is moved between a supply reel 40 and a take up reel 41 via guide rollers 42 and 43 which function to cause the recording paper 36 to directly engage the peripheral surface of rotary drum 34. An endless belt 46 is passed around a pair of spaced apart pulleys 44 and 45 and the detector 21 is secured at a predetermined position along the length of belt 46. It is to be understood that the detector 21 is disposed so that its bottom opening 26 is directed toward the axis of rotary drum 34 and that it is moved along the surface of the drum 34 in a direction indicated by an arrow (Y axis). The pulley 45 is driven by the Y axis stepping motor 32. Responsive to one pulse from the control circuit 33 each of the stepping motors 31 and 32 steps a definite angle to move recording paper 36 and detector 21 by a definite distance. Thus, stepping motors 31 and 32 effect relative movement of about 0.1 mm, for example, between recording paper 36 and detector 21 at each step. Thus, it will be seen that the driving mechanism has the same construction and function as the prior art incremental X, Y plotter.

With reference again to FIG. 1, the processing means 10 comprises a program memory 11 storing a program necessary for the scanning and tracing operations of the pattern, a decoder 12 to read the program supplied by the program memory 11, a sequence control circuit 13 to control the operating sequence of various component parts to be described later and a group of registers 14 comprised by a plurality of serially connected shift registers. The majority of these shift registers function to temporarily store a signal from an input-output circuit 15 while remaining shift registers function to store constants, modes, memory addresses, return addresses and the like. These shift registers operate in response to a sequence control signal supplied from the sequence control circuit 13 described above. An operation circuit 16 is provided to perform such operations and processings as addition, subtraction, logical product and logical addition, etc., in response to a signal supplied from the group of shift registers 14. The type of the operations is selected by an operation sequence control signal supplied from the sequence control circuit 13. A control counter 17 is provided to designate the address in the memory 11 storing the program. Thus the control counter 17 contains the content of a field representing the jumping address at the time of jumping order but the contents of the return address shift register in the group of registers 14 when the order is returned from a subroutine. There is also provided control panel 18 including various switches and indicators necessary for operating the system.

When a start switch (not shown) of a control panel 18 is depressed the various components shown in FIG. 1 commence to operate so that the detector 21 of sensor 20 begins to trace the pattern according to the program stored in the memory 11. Detector 21 is driven by the driving mechanism 30 to perform a round scanning operation of a substantially square area including the pattern on the recording paper 36 which is to be traced. Such a round scanning can be performed by the proper control of stepping motors 31 and 32 of the driving mechanism 30 provided by the control circuit 33. The number of spots to be plotted by the round scanning operation can be selected to any value by the command from the control panel 18. In an example shown in FIG. 4, 10 spots are plotted in the direction of X axis and 10 spots are plotted in the direction of Y axis. Accordingly, a total of 40 spots are plotted at each round scanning operation.

A tracing operation performed on a typical pattern on the recording paper 36 is as follows.

FIG. 4 shows a diagram to explain the operation of the detector 21 to trace a pattern, e.g. a curve 47 on the recording paper 36. $P_1, P_2 \ldots P_{40}$ show scanning spots as the detector 21 performs a round scanning operation of the pattern on the recording paper by being moved along the periphery of a square area. White dots and black dots represented on positions corresponding to these scanning spots show the results obtained by judging the output of the detector 21 generated by scanning these spots, by the operation of the processing circuit 22. More particularly, a white dot at a spot $P_1$ shows that the result provided by judging the output from detector 21 corresponding to this spot by means of processing circuit 22 is "white". In the same manner, a black dot at a spot $P_{16}$ shows that the result provided by judging the output from detector 21 corresponding to this spot by means of the processing circuit 22 is "black". "Black" dot shows that there is present a pattern of some type at that spot. Accordingly, in the illustrated example, the black dots show that the pattern includes spots $P_{16}, P_{17}, P_{18}$ and spots $P_{35}, P_{36}$ and $P_{37}$. It is clear that, in this case the curve 47 is traced by these two groups of information and by information obtained during the previous scanning. These two groups of information are supplied to the group of registers 14 from the processing circuit 22 via the input-output circuit 15 of the processing means 10, and are stored in these registers. These data stored in the registers 14 are operated and processed by the operation circuit 16 according to the prescribed program. First, of said two groups of spots, spots $P_{17}$ and $P_{36}$ near the center of curve 47 are determined. These spots near the center can be determined by averaging the maximum value and the minimum value of the numbers of the spots of respective groups and the value obtained is stored in registers 14. Spots $P_{17}$ and $P_{36}$ represent the direction of curve 47 and either one of them represents the direction of tracing. In order to determine which one of the information at the center of respective groups represents the direction of tracing, the direction of tracing in the previous scanning is stored in the registers 14. Consequently, the direction most close to the direction of previous scanning is judged as the direction of tracing. For this reason, in the succeeding scanning operation this direction is treated as the direction of previous scanning. The direction in which the tracing is forbidden is treated in the same manner. The center of the above described round scanning is considered to lie generally on a curve 47.

Figure 5:
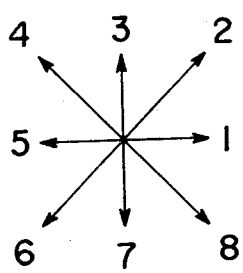
FIG. 5 shows one example of predetermined reference directions utilized to determine the pattern tracing direction of the detector.

With reference now to FIG. 5, a method of judging the direction along which the detector 21 is to be traced will be described in the following. As shown in FIG. 5, eight reference directions 1 to 8 are predetermined. These directions are designated by codes "1", "2" . . . "8" in the clockwise direction. If it is assumed now that the spot $P_{17}$ represents the direction of scanning this spot is made to correspond to reference direction "1" and an output corresponding to this "1" direction is sent to control circuit 33 of driving mechanism 30 from registers 14 via input-output circuit 15, and the positional information of spot 17 is stored in register group 14. In FIG. 4, since there are 40 spots to be plotted it is necessary to store the number of these spots, and the stored number is treated to represent the direction of previous tracing during the succeeding scanning operation.

Figure 6:
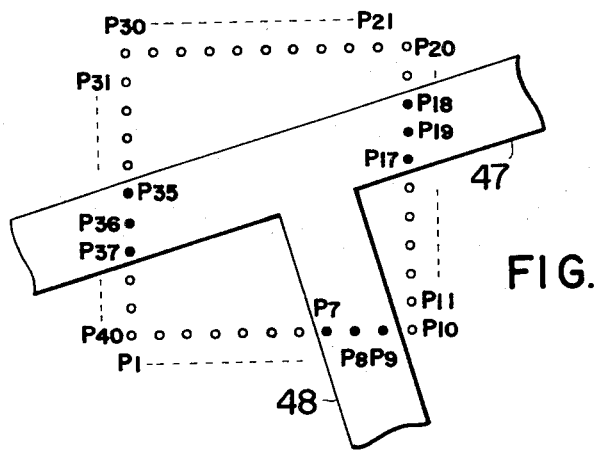
FIG. 6 is a diagram to explain the relationship between the round scanning operation of the detector, the detector output and the output from the processing circuit when a curve depicted on a recording paper includes a branch line.

FIG. 6 is a diagram to explain the tracing operation where curve 47 includes a branch line 48. In this case, information is obtained representing that the pattern lies on spots $P_{35}$, $P_{36}$, $P_{37}$; $P_{16}$, $P_{17}$, $P_{18}$; and $P_7$, $P_8$, $P_9$. As a result, like the foregoing description with reference to FIG. 5 the processing means 10 provides information of spots $P_{36}$, $P_{17}$ and $P_8$ which are at the centers of the above described three groups of information and this information is compared with those of the previous scanning to determine what spot corresponds to the direction of tracing whereby to send a signal to the driving mechanism 30 for performing the tracing operation in the tracing direction thus determined. In this case, in addition to the informations regarding the direction to be traced and the direction that has been traced, information regarding spot $P_8$ is obtained which shows that there is a branched or crossing curve 48, thus requesting processing means 10 to perform another operation. If the tracing directions at respective scanning operations are represented by codes such as "2, 2, 1, 3, 1 . . .", these data will represent the configuration of the curve.

Figure 7:
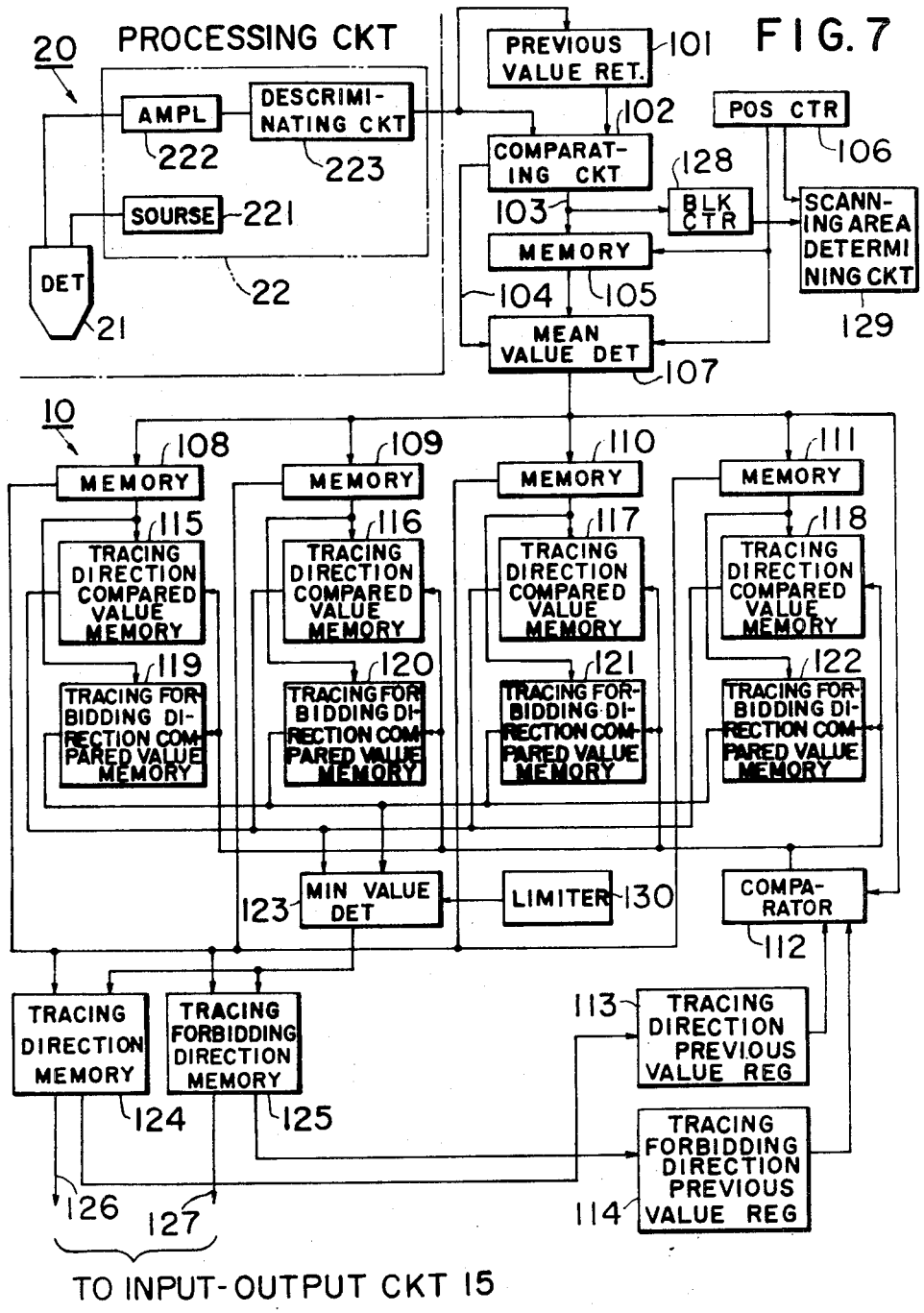
FIG. 7 shows a block diagram wherein respective program operations of the system shown in FIG. 1 are replaced by hardware.

The above described operation can be more fully understood from the following description regarding the block diagram shown in FIG. 7 wherein various operations processed according to a program in the case of FIG. 1 are replaced by hardware and wherein the processing means 10 and a portion of sensor 20 are shown in detail.

In FIG. 7, source of light 27 (See FIG. 2) of detector 21 is connected to a source of current 221 in the processing circuit 22 which further includes a DC amplifier 222 and a descriminating circuit 223 responsive to the output of amplifier 222 for descriminating white and black. The descriminating circuit 223 provides an output "1" for a white spot and an output "0" for a black spot. The output from descriminating circuit 223 is supplied to a previous value retainer 101. The output is also sent to a comparator circuit 102 which compares the output from previous value retainer 101 and the output from descriminating circuit 223. When the tracing information changes from white to black as a result of comparison of these two outputs a "1" output will be sent to conductor 103 whereas when the information changes from black to white a "1" output will be provided for conductor 104. The "1" output on conductor 103 is applied to a memory 105 whereupon the memory 105 stores the positional information of detector 21 from a position counter 106. This condition corresponds to the movement of detector 21 from spot $P_6$ to spot $P_7$, for example, in FIG. 6. Upon further movement of detector 21, comparator circuit 102 again detects the change of from black to white to provide a "1" output on conductor 104, this output being supplied to a mean value detector 107. This condition corresponds to the movement of the detector from spot $P_9$ to spot $P_{10}$, in FIG. 6. Accordingly, the mean value detector 107 operates to calculate the mean value of the previous positional information of detector 21 which has been stored in memory 105 at this stage and the present positional information of detector 21. In this manner, the positional information of a spot near the center while the detector 21 is detecting black is determined. This central spot corresponds to spot $P_8$, for example, in FIG. 6. This mean value is stored in one of memories 108 through 111, for example 108. When another mean value information is sent during the round scanning operation such information is stored successively in memories 109, 110 and 111.

A portion of the mean value information is also supplied to a comparator 112 where it is compared with an information from a tracing direction previous value register 113 and an information from a tracing forbidding direction previous value register 114 and the results of comparison are successively sent to a tracing direction compared value memories 115 through 118 and tracing forbidding direction compared value memories 119 through 122 to be stored therein. Information stored in respective tracing direction compared value memories 115 through 118 are sent to a minimum value detector 123 which detects the minimum value. Information stored in memories 108 to 111 and corresponding to this minimum value shows a value most close to the direction of previous tracing. Similarly the minimum value detector 123 operates to detect the minimum value of the information stored in tracing forbidding direction compared value memories 119 through 122. Information stored in memories 108 to 111 corresponding to respective minimum values is sent to a tracing direction memory 124, and a tracing forbidding direction memory 125 and are stored therein. The outputs from memories 124 and 125 are sent to input-output circuit 15, FIG. 1 for example, over conductors 126 and 127. As shown in FIG. 1, the output from input-output circuit 15 is supplied to an external circuit, not shown, over a conductor 19 and also to control circuit 33 of the driving mechanism 30 whereby either one or both of stepping motors 31 and 32 rotate one step to move one step either one or both of detector 21 and recording paper 36. At each round scanning operation the contents of previous value registers 113 and 114 are changed. The above described cycle of operations is repeated to trace a continuous curve or pattern.

Figure 8:
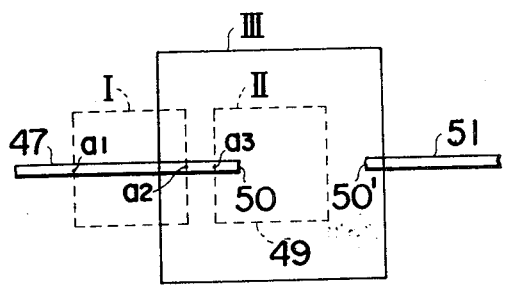
FIG. 8 is a diagram showing the relationship between a curve containing a discontinuity and the scanning area.

During tracing operation of the system it is supposed that a discontinuity or unclear portion 49 appears in the curve as shown in FIG. 8. In other words, when ends 50 and 50' of sections of curves 47 and 51 are separated by a gap 49 the system operates as follows. More particularly, when discontinuity 49 is reached during the repeated operation of the tracing system, two spots $a_1$ and $a_2$ are detected during a round scanning I but only one spot $a_3$ is detected during a round scanning II. In other words, during round scanning II, no curve presents in the tracing direction on the periphery of a square except curve 47 that has already been traced. Under these circumstances, the register or memory of the processing means 10 stores the direction of the curve last traced and the repeated tracing operations continued until that time will be interrupted. Counting of the number of spots detected during the round scanning operation is performed by a block counter 128 shown in FIG. 7 which counts the number of spots by counting the number of outputs from comparator circuit 102. The output of block counter 128 is supplied to a scanning area determining circuit 129 which operates to send a signal to driving mechanism 30 so as to broaden the scanning area whenever the number of spots detected per one round scanning decreases to one. Consequently, control circuit 33 provides a signal to stepping motors 31 and 32 so as to shift detector 21 and recording paper 36 to broaden the area of round scanning. Symbol III in FIG. 8 illustrates one example of such enlarged round scanning area. In broadening the scanning area, the length of all four sides of a square may be equally increased. Alternatively, the length of a pair of opposing sides may be increased more than the other pair of opposing sides. When curve 51 is detected as a result of such a broadened scanning area III, comparator circuit 102 supplies an output to memory 105 over conductor 103 so that memory 105 stores a positional information supplied from a position counter 106. Then mean value detector 107 determines the mean value of the output from memory 105 and the positional information from position counter 106 when detector 107 receives a signal from comparator circuit 102 via conductor !04 and the mean value determined by the mean value detector 107 is stored in either one of memories 108 through 111 in the succeeding stage. Thereafter, the system operates in the same manner as above described.

If the next curve 51 is not detected even when the scanning area is broadened to a predetermined limit, in other words, when two spots can not be detected in one round scanning operation it is considered that the curve 47 has terminated instead of a discontinuity.

Generally, curve 51 lies in the same direction as curve 47, but often lies in a different direction. This is because that microsections of a curve being traced are not always in the same direction and that a discontinuity may occur at a bend.

Where it is permissible to limit the position and direction of the curve by broadening the scanning area as above described, said stored values are compared with the last traced direction as the detector arrives at the discontinuity, and the direction of a group newly generated when two spots are detected when round scanning an enlarged area, and only when the result of comparison is within predetermined limits the new curve is judged to be a curve to be continuously traced. These limits are stored in a limiter 130, FIG. 7 and are supplied therefrom to the minimum value detector 123 to be compared therein with the least value in the outputs of memories 115–118 and the least value in the outputs of memories 119–122 respectively. As a result, minimum value detector 123 supplies an output to the succeeding stage when the limits are less than said each last value. In this manner, once another curve 51 is detected the detector is advanced to it.

Like the case wherein a curve is traced by a mechanism similar to an X, Y incremental plotter it is generally impossible to trace in any direction. In such a case, when the tracing operation is analyzed microscopically the tracing is performed by constant approximation of the direction. If one tries to interconnect sections of a curve spaced apart by a wide discontinuity by a system wherein the tracing is performed by the approximation of the direction, a large error would result.

In such a case, once the other curve to be continuously traced is detected, it is preferable to continue the tracing operation for a definite distance, to scan an area having a center at the other curve and to reduce the scanning area by an amount corresponding to the definite distance. Then, the other curve will always be included in the scanning area so that it will not be missed.

In this manner, the scanning area is generally reduced during repeated scanning operations over the definite distance and after the scanning area has reduced to the original value, the normal tracing operation is resumed with a constant tracing distance for each scanning operation.

At each round scanning operation the contents of the previous value registers 113 and 114 are changed. The above described operations are repeated to trace a continuous curve.

Although in this embodiment, a photoelectric detector has been illustrated, it will be clear that various other types of detectors may also be used including a well known magnetic detector and an electric detector depending upon the characteristics of the sheet of drawing and the property of the printing ink.

Further, to simplify the construction of the detector movable on the surface of the drawing, the photoelectric converting element and the light source may be held stationary at points remote from the read-out head movable on the drawing and the head may be connected to the light source and the photoelectric converting element through light guides made of optical fiber glass.

With a single detector of the type described above it is necessary to move it successively for scanning. Where a plurality of discrete detectors are arranged on the periphery of a square and are operated sequentially for each scanning operation it becomes unnecessary to move the detector around a square by mechanical means.

Further instead of moving the detector around a square it can also be moved along the periphery of a hexagon, pentagon or circle.

What is claimed is:

1. In a pattern tracing method which operates by alternately performing a round scan of the periphery of an elemental area and moving the center of said round scan an incremental distance comprising the steps of:

performing a round scanning operation along the periphery of an elemental area on said surface, each scan including sensing a regular line of spots on said periphery for detecting the presence or absence of said pattern from spot to spot;

storing for each said scan digital code information in response to detected changes in said presence or absence of pattern, said code identifying the location on said line of spots of each branch of said pattern traversed by said scan;

comparing a stored previous value tracing direction code with said digital code information and storing a tracing direction compared value;

comparing a stored previous value tracing forbidden direction code with said digital code information and storing a tracing forbidden direction compared value;

detecting the minimum values of respective stored tracing direction and tracing forbidden direction compared values;

storing from said stored digital code information for said branches those codes corresponding to said minimum values as a tracing direction code and tracing forbidden direction code, respectively;

moving the center of said round scanning operation over the surface containing said pattern by said incremental distance corresponding to an adjacent position for said elemental area and in one of a set of predetermined directions, the selected direction corresponding to said stored tracing direction code;

transferring said tracing direction code and said tracing forbidden direction code to up-date the respective said stored previous value codes at each said scan; and repeating alternately said performing said round scanning operation and said moving said center said incremental distance to trace said pattern, the improvement characterized by:

counting the number of branches of said curve for each said scan;

interrupting said moving of said center an incremental distance when only a single branch of said curve is detected in any scan;

increasing the size of said scan in response to counting a single branch of said curve in any scan; and resuming said predetermined round scanning operation and said moving said center alternately upon detection of two or more branches per scan.

2. The method according to claim 1 and including the steps of:

comparing the detected direction of an additional branch detected after said increasing the size of the scan to the last traced direction; and resuming said predetermined round scanning operation only if said comparing shows that the detected direction is within predetermined limits.

* * * * *